United States Patent [19]

Ladd et al.

[11] Patent Number: 4,798,708

[45] Date of Patent: Jan. 17, 1989

[54] PROCESS FOR RECOVERING CHROMIUM AND OTHER METAL VALUES FROM CHROMIUM BEARING MATERIAL

[75] Inventors: Judith A. Ladd, Sayre; Michael J. Miller, Towanda, both of Pa.

[73] Assignee: GTE Products Corporation, Stamford, Conn.

[21] Appl. No.: 157,756

[22] Filed: Feb. 16, 1988

[51] Int. Cl.$^4$ ............................................. C01G 37/00
[52] U.S. Cl. ..................................... 423/55; 210/688; 210/720; 210/724; 210/913; 423/54; 423/92; 423/122; 423/131; 423/140
[58] Field of Search ............... 210/665, 669, 688, 720, 210/724, 913; 423/54, 55, 92, 122, 131, 139, 140

[56] References Cited

U.S. PATENT DOCUMENTS

| | | |
|---|---|---|
| 4,207,295 | 6/1980 | Kagetsu et al. .................. 423/55 |
| 4,298,581 | 11/1981 | Douglas et al. .................. 423/55 |
| 4,305,754 | 12/1981 | Rappas et al. .................... 423/55 |
| 4,668,483 | 5/1987 | Ladd et al. ....................... 423/55 |

Primary Examiner—Ivars Cintins
Attorney, Agent, or Firm—Donald R. Castle; L. Rita Quatrini

[57] ABSTRACT

A process is disclosed for recovering metals from chromium bearing material comprising one or more or the metals of cobalt, nickel, molybdenum, tungsten, iron, tin, aluminum. The process comprises atomizing the material to produce a flowable powder which is then fused in an oxidizing atmosphere with sufficient alkali metal hydroxide at a temperature sufficient to form a nonmagnetic fused material in which the chromium, tungsten and molybdenum are present as water soluble salts. The resulting fused material is then slurried with a sufficient amount of water to dissolve the water soluble compounds. The pH is adjusted to from about 9.2 to about 9.6 with an acid to allow insolubles to form which contain any cobalt, and nickel and the major portion of any iron, tin and aluminum followed by separating the insolubles from the resulting first liquor. The pH of the first liquor is adjusted to 0 to 2 with an acid and methyl alcohol is then added to it in an amount sufficient to reduce the chromium to the trivalent state. Activated carbon is then added in an amount sufficient to form a carbon-containing suspension wherein essentially all of any tungsten and molybdenum contained therein are adsorbed by the carbon, followed by separating the carbon-tungsten-molybdenum from the resulting second liquor, the pH of which is adjusted to about 5.0 to 8.5 with a base to form a precipitate containing essentially all of the chromium, followed by separating this precipitate from the resulting spent liquor.

12 Claims, No Drawings

PROCESS FOR RECOVERING CHROMIUM AND OTHER METAL VALUES FROM CHROMIUM BEARING MATERIAL

This invention relates to a process for recovering metal values from chromium bearing material. More particularly, it relates to a process for recovering chromium, and any molybdenum, tungsten, cobalt or nickel which may be present from superalloy scrap.

BACKGROUND OF THE INVENTION

Chromium is a strategic metal in the United States because of the nearly 100% import dependence and wide variety of important uses. Among the most critical uses for chromium is providing high temperature and oxidation resistance in both cobalt and nickel based superalloys. In order to be utilized in this application, the chromium must be of high purity. Other common uses for the metal for example in stainless steel have less stringent purity requirements.

Annually, millions of pounds of superalloy materials are removed from service and are downgraded as scrap. Much of the scrap superalloy is exported from the United States or used domestically for steel production. The value of the scrap is many times less than the value of new alloy and in some cases is less than the value of the constituent metals. Therefore this practice represents a large dollar loss as well as a loss of strategic metals from the US economy.

The recycle of superalloy materials other than by direct remelting has been economically unfeasible up to this time. In part this has been due to the lack of technology for dissolution of large amounts of material at reasonable rates. In addition, since most of the chemistry for the production of chromium metal is based on chromite ore as a starting material, separation methods to remove elements found in used superalloys but which do not naturally occur in chromite have not been fully developed.

SUMMARY OF THE INVENTION

In accordance with one aspect of this invention, there is provided a process for recovering metals from chromium bearing materials comprising one or more of the metals of cobalt, nickel, molybdenum, tungsten, iron, tin, and aluminum. The process comprises atomizing the material to produce a flowable powder which is then fused in an oxidizing atmosphere with sufficient alkali metal hydroxide at a temperature sufficient to form a nonmagnetic fused material in which the chromium, tungsten and molybdenum are present as water soluble salts. The resulting fused material is then slurried with a sufficient amount of water to dissolve the water soluble compounds. The pH is adjusted to from about 9.2 to about 9.6 with an acid to allow insolubles to form which contain any cobalt, and nickel and the major portion of any iron, tin and aluminum followed by separating the insolubles from the resulting first liquor. The pH of the first liquor is adjusted to 0 to 2 with an acid and methyl alcohol is then added to it in an amount sufficient to reduce the chromium to the trivalent state. Activated carbon is then added in an amount sufficient to form a carbon-containing suspension wherein essentially all of any tungsten and molybdenum contained therein are adsorbed by the carbon, followed by separating the carbon-tungsten-molybdenum from the resulting second liquor, the pH of which is adjusted to about 5.0 to 8.5 with a base to form a precipitate containing essentially all of the chromium, followed by separating this precipitate from the resulting spent liquor.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The process of the present invention relates to recovering metal values from chromium bearing material. The metal values are chromium and any of the metals of tungsten, molybdenum, cobalt, nickel, iron, tin, and aluminum.

The most typical chromium bearing material of this invention is superalloy scrap. This material can contain typically in percent by weight about 5–50 Cr, about 0–75 Co, 0–75 Ni, 0–30 W, 0–30 Mo, and small amounts of elements as Fe, Ti, Nb, Al, and others.

The form of the material is typically as blades, vanes, turnings, grindings and the like. The size of the pieces is limited by the size of the reaction vessels that are used. The material can be reduced in size by cutting with a plasma welding torch or other similar devices. The most typical size of the pieces is $3'' \times 4'' \times \frac{1}{2}''$.

The starting material is atomized to a flowable powder. This is done by heating the material to a temperature in excess of the melting point of the alloy but not so high as to result in sublimation of any of the more volatile metal constituents. The preferred temperature range is from about 1450° C. to about 1800° C., and most preferably from about 1560° C. to about 1630° C. depending on the alloy composition. The resulting molten metal charge is forced through a tap in the furnace by means of an applied pressure of inert gas such as nitrogen or argon. The usual value of the applied pressure is about 500 psi. The molten metal is contacted with water resulting in the formation of a porous and high surface area metal powder which is then collected and dried. The exact characteristics of the powder depend on the composition of the alloy from which the powder was derived and on the specific choice of reaction conditions. Typical properties of atomized superalloy powders produced in accordance with the above specified conditions include flow rates of from about 25 to about 50 sec/50 g, apparent densities of from about 2.9 to about 4.6 g/cc, and median particle size of from about 150 to about 290 micrometers in diameter.

The resulting powder is then fused in an oxidizing atmosphere with a sufficient amount of an alkali metal hydroxide at a temperature sufficient to form a nonmagnetic fused material in which the chromium and any tungsten and molybdenum contained therein are present as water soluble salts. The most typical oxidizing atmospheres are air and oxygen. The preferred alkali metal hydroxide is sodium hydroxide. The amount of alkali metal hydroxide can range from the stoichiometric amount which is twice the number of moles of chromium plus tungsten and molybdenum to an amount equal to about three times the weight of the starting material. Although larger amounts of hydroxide render the melt more fluid, the cost of the hydroxide and the need to subsequently neutralize the excess favor the use of the stoichiometric amount. In practice the preferred amount of sodium hydroxide is less than about half the weight of the starting material. For other alkali metal hydroxides the preferred amount must be increased or decreased accordingly to the proportional difference in molecular weights between the alkali metal hydroxide which is used and sodium hydroxide. The mixture of the starting powder and alkali hydroxide is loaded into a reaction vessel. The vessel is preferably constructed of sintered ceramic such as alumina or magnesia or an alloy such as INCO 600 or 601 or other high temperature oxidation resistant alloy which does not contain substantial percentages of either chromium, tungsten, or molybdenum. The vessel is then heated in the oxidizing atmosphere. The preferred temperature is from about 600° C. to about 1000° C., and most preferably from about 850° C. to about 925° C. until the powder is reacted. The higher the temperature the higher the reaction rate. At temperatures above about 1000° C. the rate of evaporation of molten sodium hydroxide becomes substantial. Therefore it is desirable to hold the temperature below 1000° C. The completion of the reaction is determined by the disappearance of the powder, by the formation of a nonmagnetic precipitate or by the allowable time for the reaction, or by some other means. When the reaction is determined to be complete the resulting fused material can be left to cool in the reaction vessel, or more preferably the molten mass can be decanted onto a nonreactive metal surface such as a sheet of steel to cool rapidly.

The resulting fused material is then slurried with a sufficient amount of water to dissolve the water soluble compounds which have formed as a result of the fusion reaction. This is done by breaking the material into pieces and adding to the pieces a volume of water sufficiently large to dissolve the excess alkali metal hydroxide and the compounds which can be alkali chromate, alkali tungstate, and alkali molybdate. Typically about 35 liters of water are required per kilogram of chromium assuming that enough alkali was used and all the chromium was converted to the chromate.

The pH of the resulting leachate is adjusted to about 9.2 to about 9.6 with an acid which is preferably sulfuric acid to allow insolubles to form which contain any cobalt, and nickel which is present in the leachate as their oxides and the major portion of any iron as iron oxide, and tin, and aluminum which are present in the leachate. The major portion of any silica which may be present is also contained in the insolubles.

The insolubles are separated from the resulting first liquor by standard techniques such as filtration.

The pH of the first liquor is adjusted to from 0 to about 2, and preferably from about 0.5 to about 0.7 with an acid, preferably sulfuric acid. Methyl alcohol is added to the pH adjusted first liquor in an amount sufficient to reduce the chromium to the trivalent state from the more oxidized form which is most typically the hexavalent form. This amount is most typically about 1.15 times the stoichiometric amount. It is preferred that the methyl alcohol treated liquor be agitated for a period of time to allow the reduction to take place. This is usually longer than about 1 hour and preferably at least about 2 hours. Completion of the reduction is indicated by the color change of the liquor from orange to blue-green and by the absence of substantial amounts of hexavalent chromium as determined by electrochemical or spectroscopic methods.

To the resulting methyl alcohol treated solution is added activated carbon in an amount sufficient to form a carbon containing suspension wherein essentially all of any molybdenum and tungsten which are present are adsorbed by the carbon. The amount of carbon is most typically about 5 gram of carbon per gram of tungsten and molybdenum. It is preferred that the carbon be prewashed with either dilute ammonium hydroxide or sodium hydroxide solutions followed by water, followed by dilute sulfuric acid solution. If the carbon is added batchwise to the solution, the carbon containing suspension is stirred for a period of time to allow the adsorption process to be completed. This period of time is at least about 15 minutes but more preferably longer. Alternately the solution can be passed through the charcoal which is in a column.

The carbon containing the tungsten and molybdenum is then separated from the chromium containing second liquor. If the process is a batch process, this can be done by techniques such as filtration. If the process is done with a column, the chromium-containing second liquor is collected as the effluent from the column.

The pH of the resulting second liquor is adjusted to 5.0 to about 8.5 with a base which is preferably sodium hydroxide to form a precipitate containing essentially all of the chromium. The preferred pH is about 7 at which all of the chromium precipitates. The precipitate is predominately chromic hydroxide. However chromic sulfate can also be present.

The chromium-containing precipitate is separated from the spent mother liquor by standard techniques such as filtration.

It is preferred that the chromium precipitate be washed by slurrying in water, preferably three times to remove any entrained sodium sulfate. The most preferable technique of washing this precipitate is to slurry it in hot water at at least about 50° C. to maximize the solubility of the impurities. The chromic hydroxide so obtained is relatively pure and can be converted to chromic oxide by heating preferably to at least about 350° C. for preferably at least about 3 hours.

The other metal values recovered by the process of the present invention, such as molybdenum, tungsten, cobalt, and nickel can be recovered by known methods.

While there has been shown and described what are at present considered the preferred embodiments of the invention, it will be obvious to those skilled in the art that various changes and modifications may be made therein without departing from the scope of the invention is defined by the appended claims.

What is claimed is:

1. A process for recovering metal values from chromium bearing material comprising one or more metal values selected from the group consisting of cobalt, nickel, molybdenum, tungsten, iron, tin and aluminum, said process comprising:

(a) atomizing said material to produce a flowable powder;

(b) fusing said powder in an oxidizing atmosphere with a sufficient amount of an alkali metal hydroxide at a temperature sufficient to form a nonmagnetic fused material in which said chromium and any tungsten, or molybdenum contained therein are present as water soluble salts;

(c) slurrying said fused material with a sufficient amount of water to dissolve the water soluble compounds contained therein and form a leachate containing said soluble compounds:

(d) adjusting the pH of said leachate to from about 9.2 to about 9.6 with an acid to allow insolubles to form which contain any cobalt, and nickel which is present in said leachate and the major portion of any iron, tin and aluminum which is present in said leachate;

(e) separating said insolubles from the resulting first liquor;

(f) adjusting the pH of said first liquor to from about 0 to about 2 with an acid;

(g) adding to the resulting pH adjusted first liquor, methyl alcohol in an amount sufficient to reduce said chromium to the trivalent state;

(h) adding to the resulting methyl alcohol treated solution, activated carbon in an amount sufficient to form a carbon-containing suspension wherein essentially all of any molybdenum and tungsten contained therein are adsorbed by said carbon;

(i) separating said carbon with the adsorbed molybdenum and tungsten from the resulting chromium-containing second liquor;

(j) adjusting the pH of said second liquor to from about 5.0 to about 8.5 with a base to form a precipitate containing essentially all of said chromium; and (k) separating said chromium containing-precipitate from the resulting spent liquor.

2. A process of claim 1 wherein said oxidizing atmosphere is selected from the group consisting of air and oxygen.

3. A process of claim 1 wherein said alkali metal hydroxide is sodium hydroxide.

4. A process of claim 3 wherein the amount of sodium hydroxide ranges from a number of moles equal to twice the combined moles of chromium, tungsten and molybdenum to an amount equal to about three times the weight of said chromium bearing material.

5. A process of claim 1 wherein said temperature of fusing is from about 600° C. to about 1000° C.

6. A process of claim 1 wherein the pH of said leachate is adjusted with sulfuric acid.

7. A process of claim 1 wherein the pH of said first liquor is adjusted to from about 0.5 to about 0.7.

8. A process of claim 1 wherein the pH of said first liquor is adjusted with sulfuric acid.

9. A process of claim 1 wherein the amount of methyl alcohol is equal to about 1.15 times the stoichiometric amount required to completely reduce said chromium to the trivalent state.

10. A process of claim 1 wherein the amount of said activated carbon is equal to about 5 g of carbon per gram of tungsten and molybdenum which are present.

11. A process of claim 1 wherein the pH of said second liquor is adjusted to about 7.

12. A process of claim 1 wherein said base is sodium hydroxide.

* * * * *